United States Patent Office 3,537,813
Patented Nov. 3, 1970

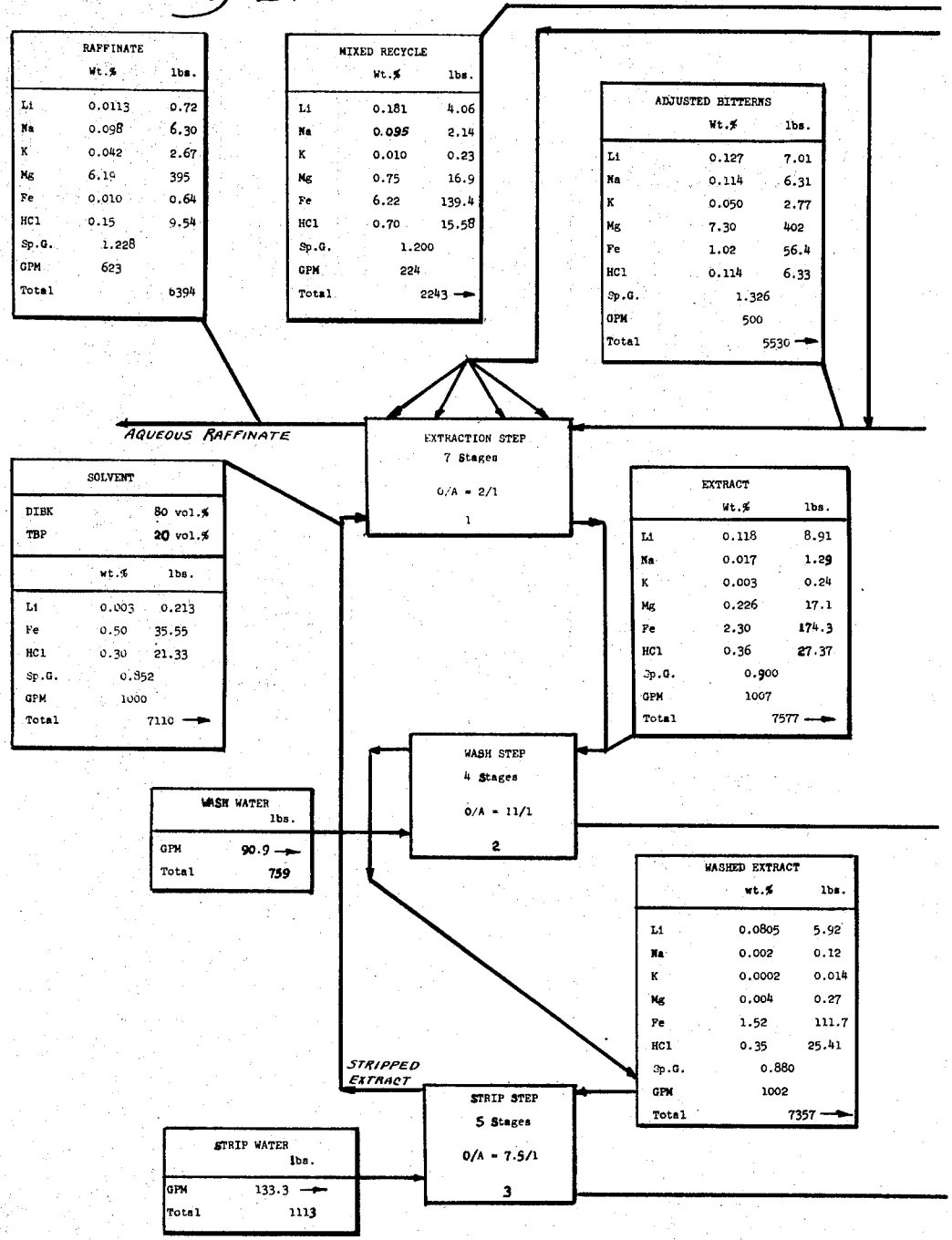

3,537,813
RECOVERY OF LITHIUM FROM BITTERNS
Joseph R. Nelli and Theodore E. Arthur, Jr., Gastonia, N.C., assignors to Lithium Corporation of America, New York, N.Y., a corporation of Delaware
Continuation-in-part of application Ser. No. 570,192, Aug. 4, 1966. This application Apr. 25, 1968, Ser. No. 724,295
Int. Cl. C01d 11/02
U.S. Cl. 23—89     17 Claims

ABSTRACT OF THE DISCLOSURE

A process for recovering certain mineral, especially lithium, values from liquids obtained from brines or sea water, after removing the major content of sodium chloride and reducing the content of other salts in said brines or sea water. A metal halide which is reactive with lithium to form a lithium-containing compound, particularly ferric chloride, is added to the liquid, together with an acid, such as hydrochloric acid, to inhibit hydrolysis of the metal halide, and the lithium values are recovered by extraction with a water-insoluble organic solvent, phase separation, and washing of said separated organic solvent extract phase with water.

CROSS-REFERENCE TO RELATED DISCLOSURE

This application is a continuation-in-part of application Ser. No. 570,192, filed Aug. 4, 1966, now abandoned.

BACKGROUND OF THE INVENTION

Field of the invention

The present invention relates to a process for recovering certain residual mineral values, particularly lithium, from waste liquids or bitterns resulting from the extraction of various salts from brine or sea water.

Description of the prior art

It is well recognized that the waste liquids resulting from the processing of brines or sea water contain important mineral values. Among these are lithium salts, particularly lithium chloride, which is present in the waste liquid in small, but commercially significant, quantities along with various percentages of other salts principally including those of magnesium, sodium and potassium. Considerable research and effort have been directed toward the development of processes for recovering the lithium values from such waste liquid. While a number of processes have evolved from work in this area, generally speaking, they are unsatisfactory due to their complexity and the excessive costs involved in the ultimate recovery of the desired values. As a consequence, there are essentially no large commercial operations in use wherein the recovery of such values is carried out separately or as a part of an overall process for recovering mineral values generally from brines or sea water. The present invention provides a simple, inexpensive procedure for recovering lithium values from waste liquids of the type mentioned.

SUMMARY OF THE INVENTION

In accordance with the present invention, it has been discovered that a high percentage of the lithium values contained in waste liquids or bitterns resulting from the processing of brines or sea water can be recovered by adding a metallic, and especially an iron, salt to the liquid under conditions to inhibit hydrolyzation of the salt, whereby the salt reacts with the lithium salts, e.g. lithium chloride, present in the liquid to form a compound which then can be extracted from the liquid with a suitable organic solvent. The lithium is then separated from the compound and the metallic salt and the organic solvent is recycled in the process. The extraction of the compound formed by the reaction of the metallic salt with the lithium is carried out with an organic solvent which is essentially insoluble, or difficultly soluble, in water. Reextraction of the compound from the organic solvent is achieved with ordinary tap water. The reaction involving the lithium present in the waste liquid or bitterns takes place substantially independently of other mineral values present. While the process of the present invention is uniquely suitable for the recovery of lithium values, it can be used to advantage in recovering or extracting and/or separating other mineral values in waste liquids or bitterns. Thus, other alkali metal salts (other than sodium), and other metal salts, for example, magnesium salts, commonly present in such liquids, can be recovered along with, or separately from, the lithium values present without requiring any substantial departure from the basic processing steps outlined herein. It should be understood that no claim is made to any novelty in the concept broadly of extracting iron from iron-containing hydrochloric or perchloric acid solutions, or from acid solutions containing iron and other salts such as lithium chloride, calcium chloride, magnesium chloride or aluminum chloride by means of organic solvents of various types.

BRIEF DESCRIPTION OF THE DRAWING

The accompanying drawing

DESCRIPTION OF THE PREFERRED EMBODIMENTS

Figure 1:
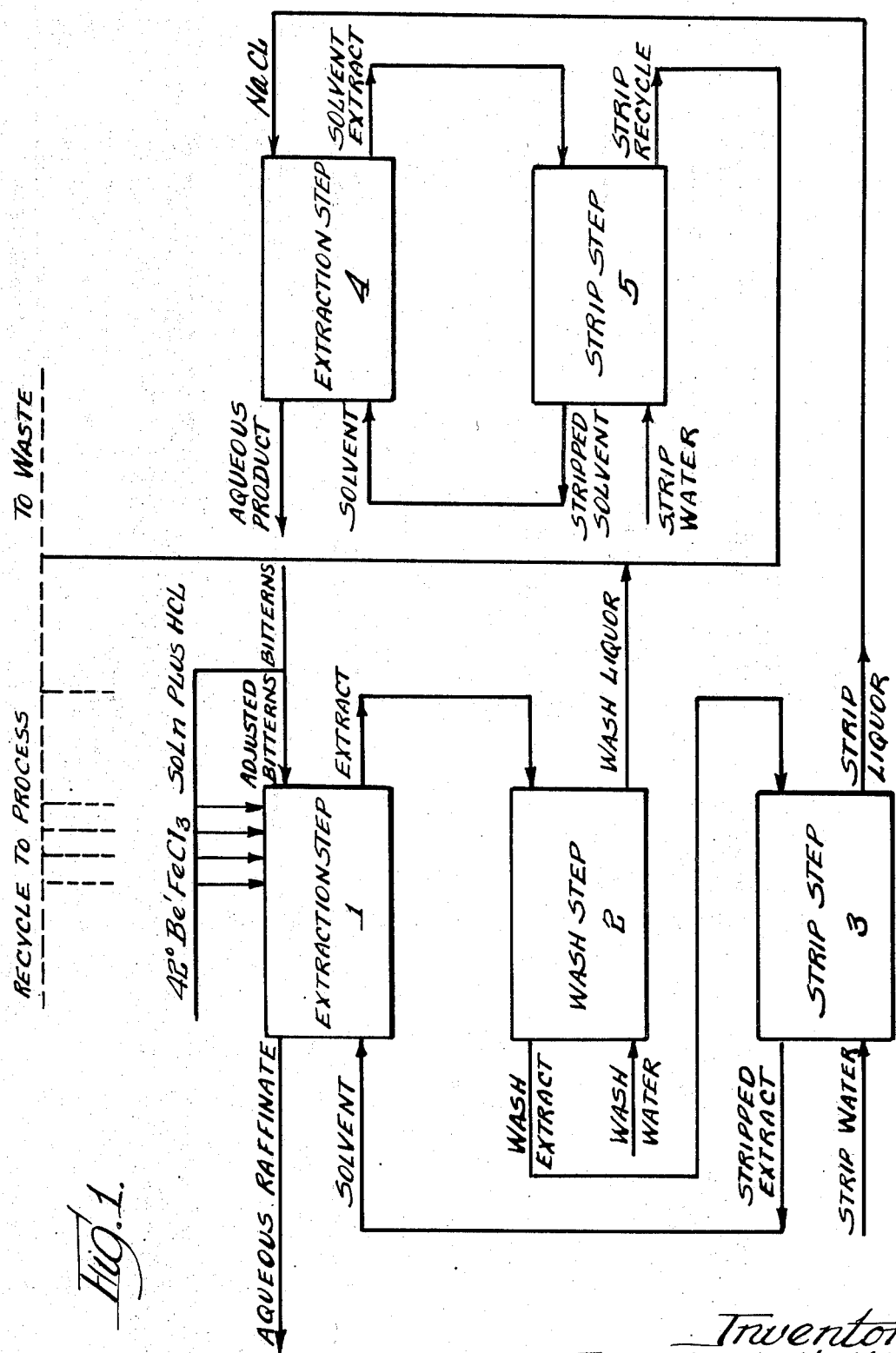
FIG. 1 is a diagrammatic or schematic form of equipment arrangement for carrying out the process of the present invention.

The metallic salts having utility in the practice of the present invention are characterized in that they are capable, in solution, of forming a stable compound with lithium, and/or magnesium, if such be the case, which can be extracted with a suitable organic solvent and then recovered, as by simple extraction, from the solvent. As indicated, the metallic salt is added to the waste liquid or bitterns under conditions such that the salt will not be hydrolyzed to any appreciable extent. To this end, the metallic salt advantageously, and further, is characterized in that it is capable of forming, with an acid, a dissociable acid salt or complex which, in solution, resists hydrolyzation but readily undergoes a replacement reaction with, for instance, a lithium salt to yield the desired extractable compound.

While there are a number of metallic salts having properties which satisfy the foregoing criteria, the objectives of the present invention are most advantageously met by utilizing metal halides, particularly the chlorides and bromides of ferric iron, cobalt and nickel. Of this group, ferric chloride, especially in a hydrated form such as ferric chloride hexahydrate, is preferred and the dissociable acid salt or complex which is formed is soluble lithium tetrahaloferrate. The metal halide can be added to the waste liquid or bitterns as an acid solution or can be added to a suitably acidified waste liquid or bitterns. The concentration of the metal halide solutions employed in the practice of the present invention is somewhat variable. In utilizing ferric chloride, for example, as the metallic salt, good results can be attained with solutions comprising, by weight, from about 30 to 50% ferric chloride, with particularly satisfactory results being obtained with solutions in which the weight percent of ferric chloride ranges from about 38 to 45%, for instance, a 42° Baumé solution which contains about 40% ferric chloride.

The process of the present invention can be carried out in both chloride and bromide systems. The acid employed, therefore, should be one which is compatible with such a system. Further, in this same connection, the acid used in the process advantageously is one that is capable of forming an acid salt or complex with the metallic salt which, in solution, will not only substantially prevent hydrolyzation of the metallic salt but will dissociate to provide an anion for reacting with the desired metal cation values present in the waste liquid or bitterns. In a chloride system, utilizing ferric chloride as the metal halide to recover lithium values, for example,, from the system, the preferred acids are chlorine-containing acids such as hydrochloric or perchloric acid. In such a system, the hydrochloric acid or perchloric acid desirably is employed in the form of aqueous solutions of strength of from about 20% to 30%, usually about 25%. Sulfuric acid can also be employed but it is particularly preferred to use hydrochloric acid.

The quantity of the metallic salt that is added to the waste liquid or bitterns can vary within appreciable limits. Thus, by way of illustration, in recovering lithium values from a chloride system utilizing ferric chloride as the metallic salt, the generally optimum objectives of the invention are attained when the ferric chloride is introduced in an amount sufficient to provide a ferric-to-lithium gram-ion ratio of the order of from about 0.5:1 to about 1.5:1, especially desirably a gram-ion ratio of about 1:1.

The acid, whether added as part of the metallic salt solution or separately, should be present in the waste liquid or bitterns in an amount such that the acid concentration is sufficiently high to prevent hydrolysis of the metallic salt. To this end, the acid should be used in an amount sufficient to provide an acid concentration in the waste liquid or bitterns in the range of from about 0.02 N to 0.3 N, usually 0.04 N to 0.1 N.

The organic solvents employed in the process of the present invention for extracting the desired compound formed in the waste liquid or bitterns, apart from having good extraction properties with respect to said compound, are characterized in that they are insoluble, or difficultly soluble, in water, and thus are readily separable from the aqueous phase of the solutions by decantation or other such conventional separation techniques. Of a variety of solvents satisfying these criteria, certain oxygen-containing solvents are particularly suitable for the purposes of this invention. Exemplary of such solvents are esters such as n-butyl acetate, ethyl acetate, amyl acetate and isopentyl acetate; ketones exemplified by distilled cyclohexanone, diisobutyl ketone and isobutyl methyl ketone; ethers such as diisopropyl ethers; 1-ethoxybutane and 1-ethoxyhexane; alcohols such as 3-methyl pentanol and 2-hexanol; and the like, and compatible mixtures thereof. Of this group, diisobutyl ketone is especially preferred due to its low solubility in water, its general availability, its good extraction properties, and its good chemical stability.

It is especially desirable to use, in conjunction with the aforementioned solvents, certain neutral or acidic phosphorus esters such as are described below, and particularly satisfactory is tributyl phosphate. Such phosphorus esters are used in minor proportions in the mixture of solvents. They tend to enhance the extraction of the desired compound and they tend to reduce the possibility of formation of undesirable emulsion conditions. In general, such phosphorus esters, where used, will usually constitute from 15 to 25%, by volume, of the total solvent mixture. An illustrative, and highly desirable, solvent mixture is about 80% diisobutyl ketone and about 20% tributyl phosphate.

The quantity of organic solvent utilized in the extraction step of the process can vary within appreciable limits. From the standpoint of practical considerations, however, it is desirable to employ only so much of the solvent as is necessary to effect extraction of the compound resulting from the reaction of the anion furnished by the dissociable metallic salt-acid salt or complex with the metal cation value, or values, present in the waste liquid or bitterns. Generally speaking, the objectives of this invention can be attained at the extraction step of the process with organic solvent-to-aqueous solution volume ratios ranging from about 0.5:1 to about 3:1, especially desirably with a ratio of about 1 to 2 of the organic solvent to 1 of the aqueous solution. At the wash step, following extraction with the organic solvent, the organic solvent-to-aqueous ratios advantageously should range from about 8:1 to about 15:1, preferably from about 10 or 11 volumes of the organic solvent to 1 of aqueous solution. The higher organic solvent-to-aqueous ratio employed at this step in the process tends to limit the drive of the desired metal value-containing compound into the aqueous phase. At the strip step of the process, on the other hand, recovery of the desired metal values is favored by organic solvent-to-aqueous ratios substantially lower than those utilized at the wash step. Generally speaking, organic solvent-to-aqueous ratios at this step will range from about 3:1 to about 10:1, usually about 3 to 7 volumes of the solvent to 1 of the aqueous solution.

Referring, now, to FIG. 1 of the accompanying drawings, in which there is illustrated in diagrammatic or schematic form an arrangement for carrying out the process of the present invention for the recovery of lithium values from bitterns by a continuous countercurrent single stage or multi-stage mixer-settler operation, at extraction step 1, a bitterns solution, to which an aqueous ferric chloride-hydrochloric acid solution has been added, forming soluble lithium tetrahaloferrate is contacted with an organic solvent stream. The adjusted bitterns solution and solvent are thoroughly mixed, and phase separation is then allowed to take place. The aqueous raffinate phase from step 1 is discarded and the organic phase is passed to a wash step 2 where it is mixed with a stream of fresh water. Following phase separation at step 2, the washed extract is passed to a strip step 3. Here the washed extract is contacted with another stream of water. The solvent-rich stripped extract from step 3 is recycled to step 1 while the strip liquor is passed to a second extraction step 4. Prior to entering step 4, the chloride ion content of the strip liquor from step 3 is adjusted by the addition thereto of a chlorine-containing salt such, for example, as sodium chloride or potassium chloride. The quantity of the chlorine-containing salt added at this step in the process should be sufficient to provide a chloride ion concentration in the strip liquor of at least 2 M, and preferably higher. The increased chloride ion concentration in the strip liquor tends to drive the ferric iron into the organic phase resulting from the addition, at step 4, of a solvent to the strip liquor. The solvent added at this step advantageously should favor extraction of the ferric iron present in the strip liquor to the exclusion of the lithium values contained therein. Exemplary of a solvent having good selectivity as well as extraction capabilities for this purpose is a mixed solvent comprising a combination of a neutral phosphorus ester, an acidic phosphorus ester and a diluent, such that the physical and chemical properties of the individual components of the combination complement each other. The neutral phosphorus esters employed in the combination can be characterized in that the substituents on the phosphoryl group, P=O, may be alkoxy, RO, a combination of alkoxy and alkyl, or alkyl, wherein the alkyl substituent or substituents, may be represented by the general formula $C_nH_{2n+1}$. Generally speaking, the order of increasing extraction power of the neutral phosphorus ester, based on substitution of the phosphoryl group, will be phosphate, phosphonate, phosphinate and phosphine oxide. The acid phosphorus ester component used in the mixed solvent can be characterized in that the substituents on the divalent phosphino group, :POOH, thereof may be dialkoxy or dialkyl, while the substituents on the monovalent phosphonon group, :PO(OH)$_2$, where such is the case, may be monoalkoxy or monoalkyl. The diluent utilized in the mixed solvent most advantageously is a non-polar aromatic hydrocarbon exemplified by benzene, toluene, and xylene, or commercially available aromatic diluents such as those sold under the trade designations "Amsco Solv D" (American Oil Co.) and "Solvesso 100" (Esso). An illustrative example of a mixed solvent having the properties desired is one containing tri-n-butyl phosphate and di(2-ethyl hexyl)phosphoric acid, in a mole ratio of about 1:1, with benzene as the diluent.

The solvent extract from step 4 is passed to a strip step 5 where it is contacted with a stream of water. The stripped solvent from this step is recycled to step 4 and the strip liquor, containing the recovered ferric chloride, is recycled through the process. The aqueous product from step 4 contains the desired lithium values in the form of lithium chloride. The aqueous solution is evaporated to effect precipitation of the chloride-containing salt added to the strip liquor obtained from step 3. Following separation of the precipitated salt from the aqueous product, which salt may be recycled to step 4, the resulting solution may be evaporated to obtain anhydrous lithium chloride, or the lithium values present therein can be recovered by chemical means as by addition of sodium carbonate to effect precipitation of the lithium as lithium carbonate.

By far the major proportion of the lithium values is extracted at step 1 of the process, but, from an economic standpoint, in mulitple stages. The raffinate from step 1 may be discarded or treated, if desired, to recover lithium and other mineral values therefrom. In those instances where lithium and magnesium are present in the bitterns and the magnesium may interfere with the extraction of the lithium values, it is possible, in accordance with the practice of this invention, to control the extent of magnesium interference by proper adjustment of the organic solvent phase-to-aqueous phase ratios at the wash step. Since the aqueous phase has a greater affinity for the magnesium salt values, by utilizing a limited quantity of water at the wash step to thereby increase the organic solvent phase-to-aqueous phase ratio, a concentration of magnesium salt values is obtained which is sufficient to suppress the re-extraction of the lithium values.

Variations in the ratios of values, particularly with reference to lithium and magnesium value ratios, obtained by the practice of the process of this invention, can be controlled by changing the concentration of either the metallic salt or the acid, or both. In this connection, the following generalizations can be made (1) increasing the metallic salt concentration at constant acid concentration does not increase lithium value extraction but does increase magnesium extraction; and (2) increasing the acid concentration decreases the extraction of both lithium and magnesium values but produces lower magnesium-to-lithium value ratios.

The process of the present invention, in its optimum aspects, enables the recovery of greater than 80% of the lithium values from waste liquids or bitterns having a magnesium-to-lithium ratio of about 100:1. The economics of the process are extremely good both from the standpoint of the relatively few processing steps involved and in view of the fact that both the metallic salt and the solvent utilized can be readily recovered for recycle through the process.

Figure 2:
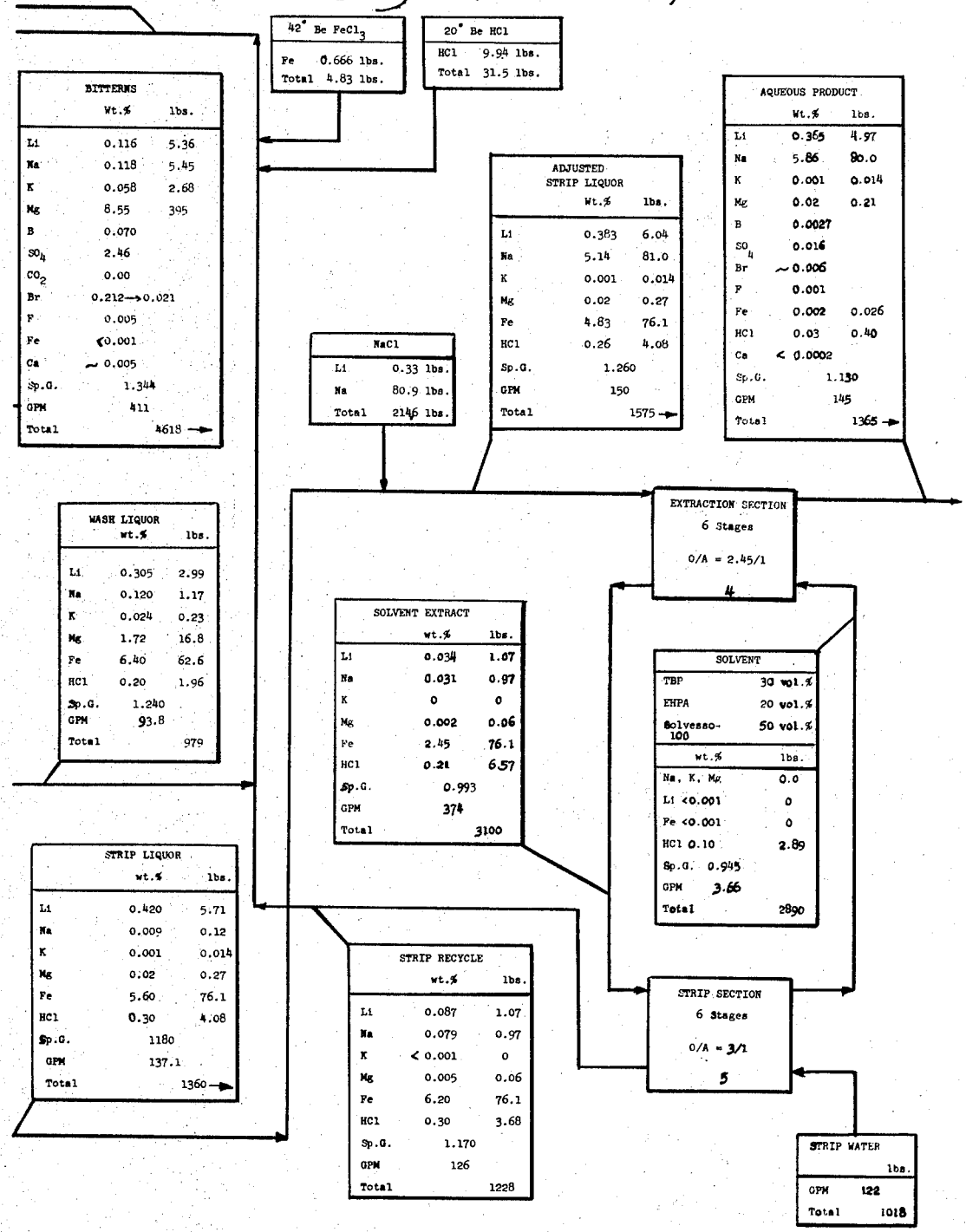
FIG. 2 represents an arrangement similar to that of FIG. 1 but includes thereon references to compositions of the starting bitterns and material balances in the compositions of at the various stages of the process in a typical illustrative example in carrying out the extractions, washes and stripping operations in multiple stages.

In FIG. 2, the material balances are shown, in the case of an illustrative example, in relation to the various steps of the process. The following abbreviations apply: g.p.m. is gallons per minute; IBK is diisobutyl ketone; TBP is tributyl phosphate; EHPA is di-2-ethylhexyl phosphoric acid; and O/A is organic to aqueous volume ratio.

The following examples are illustrative of the practice of the present invention. While the examples primarily involve a mulitstage continuous countercurrent mixer-settler, batch type operation, it should be understood, as indicated, hereinabove, that a distinctly major percentage of the desired lithium values can be extracted in a single stage.

EXAMPLE I

Extraction step—3,000 mls. of a synthetic bitterns (a saturated aqueous chloride solution containing about 0.076% Li, 7.80% Mg, 0.22% Na, 0.20% K and 2.0% $SO_4^-$) were adjusted with 127.6 mls. of 42° Bé. $FeCl_3$ solution and 10 mls. of 25% HCl solution, thereby forming soluble lithium tetrahaloferrate. This adjusted bitterns had a gm.-ion ratio of Li to Fe of about 1 to 1, and a HCl concentration of about 0.07% to prevent hydrolysis of the $FeCl_3$. In a batch simulation of a seven-stage continuous, countercurrent mixer-settler operation, 300 mls. of adjusted bitterns were contacted with 200 mls. of diisobutyl ketone (DIBK). 9, 7, 5½ and 4 mls. of 42° Bé. $FeCl_3$ solution were added to the aqueous phases leaving stages 7, 6, 5 and 4, respectively.

Wash step—In a batch simulation of a four-stage continuous countercurrent mixer-settler operation, 350 mls. of extract from the above step were contacted with 35 mls. of wash water.

Strip step—In a batch simulation of a five-stage continuous countercurrent mixer-settler operation, 300 mls. of washed extract from the above step were contacted with 60 mls. of strip water.

The following table is illustrative of the composition of the entering and exiting streams in each of the foregoing steps.

TABLE I

| Process step | Process stream | Stream analyses, wt. percent | | | Weight ratio | |
|---|---|---|---|---|---|---|
| | | Li | Mg | Fe | Li/Mg | Li/Fe |
| Extraction—Organic to aqueous Volume ratio=⅔ | Adjusted bitterns | 0.0725 | 7.43 | 0.598 | 1/102 | 1/8.25 |
| | Aqueous raffinate | 0.011 | | 0.209 | | 1/19.0 |
| | Diisobutyl ketone | 0 | 0 | 0 | | |
| | Extract | 0.125 | 0.170 | 3.14 | 1/1.36 | 1/25.1 |
| Wash—Organic to aqueous volume ratio=10/1 | Extract | 0.125 | 0.170 | 3.14 | 1/1.36 | 1/25.1 |
| | Washed extract | 0.095 | <0.002 | 1.43 | >47/1 | 1/15.0 |
| | Wash water | 0 | 0 | 0 | | |
| | Wash liquor | 0.209 | 1.04 | 9.65 | 1/5.0 | 1/46.1 |
| Strip—Organic to aqueous volume ratio=5/1 | Washed extract | 0.095 | <0.002 | 1.43 | >47/1 | 1/15.0 |
| | Stripped extract | <0.0005 | | 0.00014 | | |
| | Strip water | 0 | 0 | 0 | | |
| | Strip liquor | 0.371 | <0.002 | 5.41 | >185/1 | 1/14.6 |

EXAMPLE II

Extraction step—3000 mls. of an actual bitterns (a saturated aqueous chloride solution containing about 0.182% Li, 8.65% Mg, 0.17% Na, 0.085% K, 3.03% $SO_4^-$, and trace amounts of impurities) were adjusted with 372 mls. of 42° Bé. $FeCl_3$ solution and 20 mls. of 25% HCl solution, thereby forming soluble lithium tetrahaloferrate. The adjusted bitterns had a gm.-ion ratio of Li to Fe of about 1 to 1, and an HCl concentration of about 0.12% to prevent hydrolysis of $FeCl_3$. In a batch simulation of a seven-stage continuous countercurrent mixer-settler operation, 90 mls. of adjusted bitterns were contacted with 135 mls. of diisobutyl ketone. 3, 2.5, 2 and 1.5 mls. of 42° Bé. $FeCl_3$ solution were added to the aqueous phase leaving stages 7, 6, 5 and 4, respectively.

Wash step—In a batch simulation of a four-stage continuous countercurrent mixer-settler operation, 150 mls. of extract from the above step were contacted with 15 mls. of water.

Strip step—In a batch simulation of a four-stage continuous countercurrent mixer-settler operation, 150 mls. of washed extract from the above step were contacted with 30 mls. of water.

Illustrative stream analyses are presented in the following table.

EXAMPLE IV

Iron recovery process

Extraction step—1500 mls. of a synthetic strip liquor, (an aqueous chloride solution containing about 0.410% Li and 3.84% Fe) was adjusted with about 263 gms. of NaCl to give an adjusted strip liquor about 3 M in NaCl. In a batch simulation of a six-stage continuous countercurrent mixer-settler operation, 40 mls. of adjusted strip liquor were contacted with 50 mls. of solvent comprised of 32 parts tri-n-butyl phosphate, 18 parts di-2-ethylhexyl phosphoric acid, and 50 parts of benzene, by volume.

Strip step—In a batch simulation of a four-stage continuous countercurrent mixer-settler operation, 60 mls. of the solvent extract from the above step were contacted with 20 mls. of water. Illustrative stream analyses are given in the following table.

TABLE IV

| Process step | Process stream | Stream analyses, wt. percent | | Weight ratio, Li/Fe |
|---|---|---|---|---|
| | | Li | Fe | |
| Extraction—Organic to aqueous volume ratio=1.25/1 | Adjusted strip liquor | 0.354 | 3.32 | 1/9.4 |
| | Aqueous product | 0.395 | 0.011 | 36/1 |
| | Solvent [1] | 0 | 0 | |
| | Solvent extract | 0.024 | 2.64 | 1/110 |
| Strip—Organic to aqueous volume ratio=3/1 | do | 0.024 | 2.64 | 1/110 |
| | Stripped solvent | <0.0005 | 0.91 | |
| | Strip water | 0 | 0 | |
| | Strip recycle | 0.063 | 5.11 | 1/81 |

[1] Tri-n-butyl phosphate plus di-2-ethylhexyl phosphoric acid in benzene.

What is claimed is:

1. A process for recovering lithium values from liquid

TABLE II

| Process step | Process stream | Stream analyses, wt. percent | | | | | Weight ratio | | | |
|---|---|---|---|---|---|---|---|---|---|---|
| | | Li | Mg | Fe | Na | K | Li/Mg | Li/Fe | Na/Mg | K/Mg |
| Extraction—Organic to aqueous volume ratio =3/2. | Adjusted bitterns | 0.160 | 7.60 | 1.34 | 0.155 | 0.074 | 1/47.5 | 1/8.38 | 1/49.0 | 1/103 |
| | Aqueous raffinate | 0.0006 | | 0.113 | 0.0085 | 0.0046 | | 1/188 | | |
| | Diisobutyl ketone | 0 | 0 | 0 | 0 | 0 | | | | |
| | Exgract | 0.177 | 0.201 | 2.97 | 0.157 | 0.072 | 1/1.13 | 1/16.8 | 1/1.28 | 1/2.79 |
| Wash—Organic to aqueous volume ratio=10/1. | Extract | 0.177 | 0.201 | 2.97 | 0.157 | 0.072 | 1/1.13 | 1/16.8 | 1/1.28 | 1/2.79 |
| | Washed extract | 0.120 | <0.001 | 1.25 | | | >120/1 | 1/10.4 | | |
| | Wash water | 0 | 0 | 0 | | | | | | |
| | Wash liquor | 0.380 | 1.04 | 9.15 | | | 1/2.7 | 1/24.1 | | |
| Strip—Organic to aqueous volume ratio=5/1 | Washed extract | 0.120 | <0.001 | 1.25 | | | >120/1 | 1/10.4 | | |
| | Stripped extract | <0.0006 | | 0.0005 | | | | | | |
| | Strip water | 0 | 0 | 0 | | | | | | |
| | Strip liquor | 0.410 | <0.001 | 4.21 | 0.148 | 0.100 | >410/1 | 1/10.3 | >148/1 | >100/1 |

EXAMPLE III

Extraction step—3000 mls. of an actual bitterns (a saturated aqueous chloride solution containing about 0.0854% Li, 7.28% Mg, 0.53% Na, 0.78% K, 3% $SO_4^-$, and small amounts of impurities) were adjusted with 143 mls. of 42° Bé. $FeCl_3$ solution and 34 mls. of concentrated HCl solution, thereby forming soluble lithiumtetrahaloferrate. The adjusted bitterns had a gm.-ion ratio of Li to Fe of about 1 to 1, and an HCl concentration of about 0.06% to prevent hydrolysis of $FeCl_3$. In a batch simulation of a seven-stage continuous countercurrent mixer-settler operation, 120 mls. of adjusted bitterns were contacted with 120 mls. of diisobutyl ketone. 2, 1.6, 1.3, and 1.0 mls. of 42° Bé. $FeCl_3$ solution were added to the aqueous phases leaving stages 7, 6, 5 and 4, respectively. In addition, 0.1 ml. of concentrated HCl solution was added to the aqueous phases leaving stages 5 and 4. Illustrative stream analyses are presented in the following table.

obtained from brines or sea water, said liquid resulting from initially removing the major content of sodium chloride and reducing the content of other salts in said brines or sea water, comprising adding a chloride or bromide of a metal selected from the group of ferric iron, cobalt and nickel to said liquid under acidic conditions to inhibit hydrolyzation of the said metal chloride or bromide, allowing the said metal chloride or bromide to react with the lithium ion present in said liquid to form a soluble compound containing said lithium, extracting said soluble compound containing said lithium by means of a substantially water-insoluble organic solvent in which said soluble compound containing said lithium is soluble, and recovering the lithium values, in the form of lithium chloride or bromide, from said organic solvent extract containing the soluble compound containing said lithium.

2. A process as claimed in claim 1, wherein hydrolyzation of the metal chloride or bromide is inhibited by the addition of a chlorine- or bromine-containing acid.

TABLE III

| Process step | Process stream | Stream analyses, wt. percent | | | | | Weight ratio | | | |
|---|---|---|---|---|---|---|---|---|---|---|
| | | Li | Mg | Na | K | Fe | Li/Mg | Na/Mg | K/Mg | Li/Fe |
| Extraction—Organic to aqueous volume ratio =1/1. | Adjusted bitterns | 0.0805 | 6.86 | 0.50 | 0.74 | 0.663 | 1/85 | 1/13.7 | 1/9.3 | 1/8.23 |
| | Aqueous raffinate | 0.042 | | | | 0.082 | | | | 1/2 |
| | Diisobutyl ketone | 0 | 0 | 0 | 0 | 0 | | | | |
| | Extract | 0.064 | 0.029 | 0.22 | 0.38 | 1.98 | 2.2/1 | 7.6/1 | 13.1/11 | 1/31 |

3. A process as claimed in claim 2, wherein the organic solvent is an oxygen-containing solvent.

4. A process as claimed in claim 2, wherein the organic solvent is diisobutyl ketone.

5. A process as claimed in claim 2, wherein the organic solvent is a mixture of diisobutyl ketone with a minor amount of tributyl phosphate.

6. A process as claimed in claim 2, wherein the metal chloride is ferric chloride.

7. A process as claimed in claim 6 wherein hydrolazation of the ferric chloride is inhibited by addition of hydrochloric or perchloric acid.

8. A process for recovering lithium values from a liquid obtained from brines or sea water, said liquid resulting from initially removing the major content of sodium chloride and reducing the content of other salts in said brines or sea water, comprising adding ferric halide selected from the group of ferric chloride and ferric bromide to said liquid under acidic conditions to inhibit hydrolyzation of the ferric halide, allowing said ferric halide to react with the lithium present in said liquid to form soluble lithium tetrahaloferrate, adding a substantially water-insoluble oxygen-containing organic solvent to the liquid to extract the lithium tetrahaloferrate therefrom, separating the organic solvent from the liquid and adding water to the solvent to extract the lithium tetrahaloferrate therefrom, adding sodium or potassium chloride to the water extract to increase the chloride ion concentration thereof, adding a ferric-ion selective organic solvent to the water extract to recover said ferric halide therefrom, separating said ferric-ion selective organic solvent solution from the water extract, adding water to the solvent to extract said ferric halide therefrom, and recovering the lithium values as lithium chloride or bromide from the water extract containing the same.

9. A process as claimed in claim 8, wherein the ferric chloride is a ferric chloride hydrate.

10. A process as claimed in claim 8, wherein the oxygen-containing organic solvent is a substantially water-insoluble alcohol, ether, ester or ketone.

11. A process as claimed in claim 8, wherein the ferric halide is recycled in the process.

12. A process as claimed in claim 8, wherein a chlorine- or bromine-containing acid is added to the liquid to inhibit hydrolyzation of the ferric halide.

13. A process as claimed in 12, wherein the acid is hydrochloric or perchloric acid.

14. A process as claimed in claim 8, wherein the ferric-ion selective organic solvent is a mixed solvent comprising a neutral phosphorus ester, an acidic phosphorus ester and a non-polar aromatic hydrocarbon diluent.

15. A process as claimed in claim 14, wherein the mixed solvent comprises a mixture of tributyl phosphate and di(2-ethyl hexyl)phosphoric acid in benzene.

16. A process for recovering lithium values from waste liquids resulting from the processing of brines or sea water, comprising adding a soluble complex-forming metal chloride or bromide selected from the group of ferric iron, cobalt and nickel to said waste liquid under acidic conditions to inhibit hydrolysis of said chloride or brofide, allowing said added metal chloride or bromide to react with the lithium ion of the lithium salt to be recovered to form a complex therewith which is soluble, extracting said complex by means of a substantially water-insoluble organic solvent in which said complex is soluble, and recovering the lithium values, in the form of lithium chloride or bromide, from said organic solvent extract containing said complex.

17. A process as claimed in claim 16, in which the organic solvent is a mixture of diisobutyl ketone with a minor amount of tributyl phosphate.

References Cited

UNITED STATES PATENTS

| | | | |
|---|---|---|---|
| 2,564,241 | 8/1951 | Warf | 23—32 X |
| 2,808,313 | 10/1957 | Fleischmann | 23—32 |
| 3,144,304 | 8/1964 | Nagumo et al. | 23—140 |
| 3,154,500 | 10/1964 | Jansen et al. | |
| 3,306,712 | 2/1967 | Goodenough et al. | 23—89 X |

OTHER REFERENCES

Clark: Nucl. Sci. Abstr. vol. 16, No. 11, Abstr, No. 13128, June 12, 1962.

OSCAR R. VERTIZ, Primary Examiner

G. T. OZAK, Assistant Examiner

U.S. Cl. X.R.

23—39, 51